(12) United States Patent
Wadekar

(10) Patent No.: US 10,113,106 B2
(45) Date of Patent: Oct. 30, 2018

(54) STRENGTH-ENHANCING RESIN FOR PROPPANT

(71) Applicant: Halliburton Energyy Services, Inc., Houston, TX (US)

(72) Inventor: Sushant D. Wadekar, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/328,859

(22) PCT Filed: Aug. 23, 2014

(86) PCT No.: PCT/US2014/052427
§ 371 (c)(1),
(2) Date: Jan. 24, 2017

(87) PCT Pub. No.: WO2016/032415
PCT Pub. Date: Mar. 3, 2016

(65) Prior Publication Data
US 2017/0204325 A1    Jul. 20, 2017

(51) Int. Cl.
| | | |
|---|---|---|
| *E21B 43/267* | (2006.01) | |
| *C09K 8/80* | (2006.01) | |
| *C09K 8/62* | (2006.01) | |
| *E21B 43/26* | (2006.01) | |

(52) U.S. Cl.
CPC ............ *C09K 8/805* (2013.01); *C09K 8/62* (2013.01); *E21B 43/26* (2013.01); *E21B 43/267* (2013.01)

(58) Field of Classification Search
None
See application file for complete search history.

(56) References Cited

U.S. PATENT DOCUMENTS

| | | | |
|---|---|---|---|
| 3,976,140 A * | 8/1976 | Shaughnessy | C09K 8/5086 166/295 |
| 4,401,537 A | 8/1983 | Chern et al. | |
| 5,425,970 A | 6/1995 | Lahrmann et al. | |
| 5,609,207 A | 3/1997 | Dewprashad et al. | |
| 6,439,309 B1 * | 8/2002 | Matherly | C08G 69/48 166/276 |
| 7,963,330 B2 | 6/2011 | Nguyen et al. | |
| 8,613,320 B2 | 12/2013 | Nguyen et al. | |
| 2002/0007022 A1 * | 1/2002 | Oosedo | C08G 59/40 525/527 |

(Continued)

OTHER PUBLICATIONS

International Search Report and Written Opinion dated Apr. 29, 2015; International PCT Application No. PCT/US2014/052427.

*Primary Examiner* — Andrew Sue-Ako
(74) *Attorney, Agent, or Firm* — McGuireWoods LLP

(57) ABSTRACT

A method of coating proppant comprising: providing a curable resin having three or more epoxy functional groups; providing proppant particles; and coating the curable resin onto at least a portion of the proppant particles to create resin-coated proppant particles, wherein the curable resin does not substantially cure during the coating process. A method of fracturing a subterranean formation comprising: introducing a fracturing fluid into the subterranean formation, wherein the fracturing fluid comprises: (A) a base fluid; (B) proppant; and (C) the curable resin; and creating or enhancing one or more fractures within the subterranean formation using the fracturing fluid.

6 Claims, 2 Drawing Sheets

(56) References Cited

U.S. PATENT DOCUMENTS

| | | |
|---|---|---|
| 2006/0177661 A1* | 8/2006 | Smith .................. C04B 18/082 |
| | | 428/403 |
| 2007/0161515 A1 | 7/2007 | Bicerano |
| 2010/0249315 A1 | 9/2010 | Morita et al. |
| 2010/0326660 A1 | 12/2010 | Ballard et al. |
| 2013/0022748 A1 | 1/2013 | Kim |

* cited by examiner

STRENGTH-ENHANCING RESIN FOR PROPPANT

TECHNICAL FIELD

Curable resins are used to consolidate particles of a particle pack. A resin can be used to increase the strength of a particle pack. The resin can be used in oil or gas operations.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Figure 1:
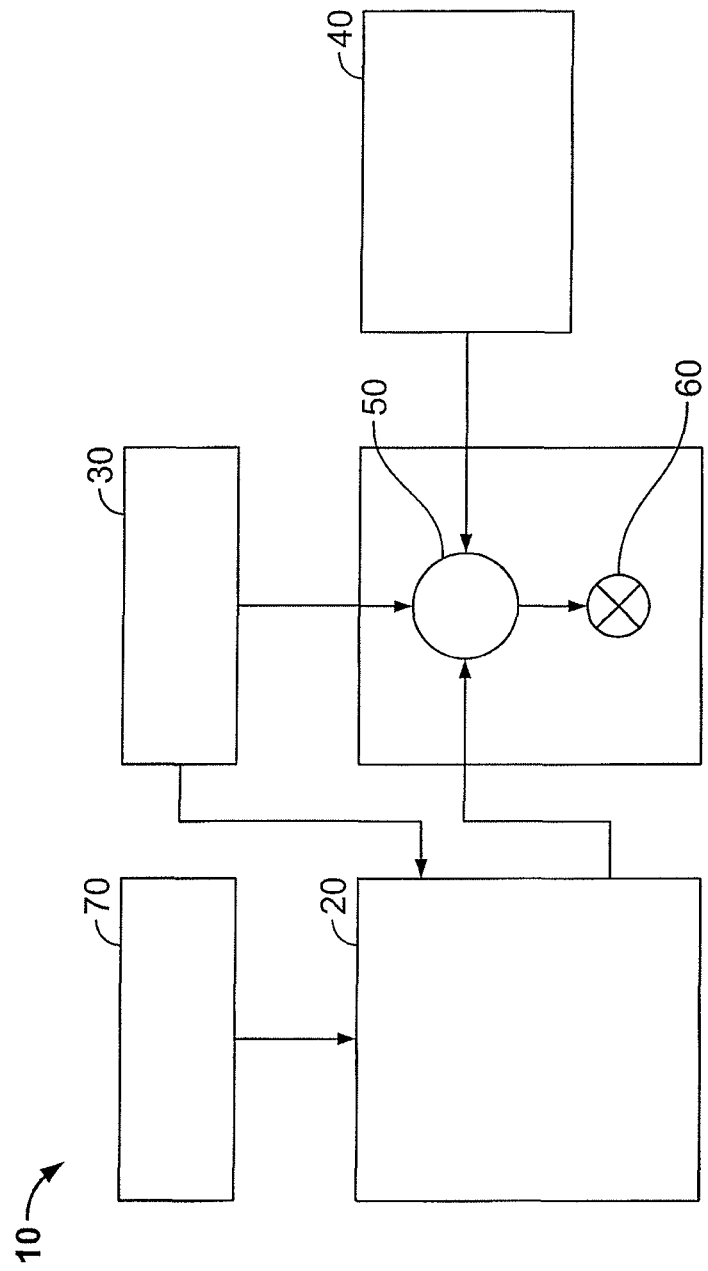
FIG. 1 is a diagram illustrating a fracturing system according to certain embodiments.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation including, into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

There are primary and remedial wellbore operations in which it is desirable to consolidate particles together. Examples of particles that are commonly consolidated together to form a consolidated pack of particles are proppant, gravel, and formation particles, such as sand and fines. Proppant is commonly used in conjunction with hydraulic fracturing operations (fracing operations). A fracturing fluid is pumped using a frac pump at a sufficiently high flow rate and high pressure into the wellbore and into the subterranean formation to create or enhance a fracture in the subterranean formation. As used herein, a "fluid" is a substance having a continuous phase that tends to flow and to conform to the outline of its container when the substance is tested at a temperature of 71° F. (22° C.) and a pressure of 1 atmosphere "atm" (0.1 megapascals "MPa"). A fluid can be a liquid or gas. A homogenous fluid has only one phase; whereas a heterogeneous fluid has more than one distinct phase. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, a "base fluid" is the liquid that is in the greatest concentration and will be the solvent of a solution or the continuous liquid phase of a heterogeneous fluid. The base fluid can contain dissolved or undissolved substances.

Creating a fracture means making a new fracture in the formation. Enhancing a fracture means enlarging a pre-existing fracture in the formation. To fracture a subterranean formation typically requires hundreds of thousands of gallons of fracturing fluid. Further, it is often desirable to fracture at more than one downhole location. Therefore, the base fluid of a fracturing fluid is usually water or water-based for various reasons, including the ready availability of water and the relatively low cost of water compared to other liquids.

The newly-created or enhanced fracture will tend to close together after pumping of the fracturing fluid has stopped due to the weight of the subterranean formation. To prevent the fracture from closing, a material must be placed in the fracture to keep the fracture propped open. A material used for this purpose is often referred to as a "proppant." The proppant is in the form of solid particles, which can be suspended in the fracturing fluid, carried down hole, and deposited in the fracture as a "proppant pack." The proppant pack generally props the fracture in an open position while allowing fluid flow through the permeability of the pack.

Proppant materials generally include silicon dioxide, walnut shells, sintered bauxite, glass, plastics, ceramic materials, and any combination thereof in any proportion. The proppant is an appropriate size to prop open the fracture and allow fluid to flow through the proppant pack, that is, in between and around the proppant making up the pack. Appropriate sizes of particulate for use as a proppant are typically in the range from about 8 to about 100 U.S. Standard Mesh. A typical proppant is sand-sized, which geologically is defined as having a largest dimension ranging from 0.0625 millimeters up to 3 millimeters.

The proppant should be sufficiently strong, that is, has a sufficient compressive or crush resistance, to prop the fracture open without being deformed or crushed by the closure stress of the fracture from the subterranean formation. Pressures from the subterranean formation on the proppant located in the fractures can be as high as 10,000 or more pounds force per square inch (psi). If a proppant material crushes under closure stress, then the fracture will close and no longer function to provide a less restrictive fluid flow path for production of reservoir fluids.

Once the proppant is placed within the fractures, if the proppant is not held in place, then the proppant can flow towards the wellhead during production. This undesirable migration can cause damage to wellbore equipment and potentially a loss of integrity, for example to the fracture or wellbore. Therefore, it is often desirable to coat the proppant with a resin to form a consolidated pack. The resin should have an affinity for the proppant and should coat the proppant. The resin can be a tacky resin that acts as a glue to bind the proppant of the pack together. The resin can also be part of a consolidation system that comprises a curable resin and a curing agent. The curing agent causes the curable resin to cure and become hard and solid via a chemical reaction, wherein heat can increase the reaction rate. After the resin cures, the proppant of the pack are consolidated. The proppant of a consolidated pack can then remain in the desired location either temporarily or permanently.

However, if the proppant is not sufficiently strong to resist crushing under pressure, then the fracturing operation may have to be repeated. Therefore, there is a need and an ongoing industry-wide concern for increasing the strength of proppant of a proppant pack.

It has been discovered that a curable resin containing three or more epoxy functional groups can be used to consolidate a proppant pack. The epoxy functional groups allow for a multi-directional, cross-linked polymer network to be formed between the curable resin and a curing agent. Some of the advantages to the new curable resin include: increases the strength of proppant pack; can be environmentally friendly; increases the operational limits, such as temperature and pressure (i.e., can fracture at higher closure pressures than before using the same type of proppant); extends the life of the proppant pack; reduces cost due to shut down for re-treatments or re-fracturing; and can be used with various types of proppant.

A polymer is a large molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain functional groups connected to the backbone at various locations along the backbone. Polymer nomenclature is generally based upon the type of monomer residues comprising the polymer. A polymer formed from one type of monomer residue is called a homopolymer. A copolymer is formed from two or more different types of monomer residues. Polymer molecules can be cross-linked. As used herein, a "cross-link" and all grammatical variations thereof is a bond between two or more polymer molecules. Cross-linked polymer molecules can form a polymer network.

According to certain embodiments, a method of coating proppant comprises: providing a curable resin having three or more epoxy functional groups; providing proppant particles; and coating the curable resin onto at least a portion of the proppant particles to create resin-coated proppant particles, wherein the curable resin does not substantially cure during the coating process.

According to certain other embodiments, a method of fracturing a subterranean formation comprises: introducing a fracturing fluid into the subterranean formation, wherein the fracturing fluid comprises: (A) a base fluid; (B) proppant; and (C) a curable resin having three or more epoxy functional groups; and creating or enhancing one or more fractures within the subterranean formation using the fracturing fluid.

It is to be understood that the discussion of preferred embodiments regarding the treatment fluid or any ingredient in the treatment fluid, is intended to apply to the method and composition embodiments. Any reference to the unit "gallons" means U.S. gallons.

According to certain embodiments, the methods are for coating proppant. The methods include providing a curable resin having three or more epoxy functional groups. The curable resin can cure when in contact with a suitable curing agent. Examples of suitable curing agents include, but are not limited to, amines, amides, acids, anhydrides, phenols, thiols, and combinations thereof. The curable resin can form a polymer with the curing agent. Other curable resins that generally only contain two epoxy functional groups tend to form only linear or straight polymer molecules with the curing agent. Unlike these other curable resins, the curable resin can form non-linear or multi-directional polymer molecules with the curing agent. The three or more epoxy functional groups can also cross-link the polymer molecules together. In this manner, the curable resin and the curing agent can form a multi-directional, cross-linked polymer network.

The curable resin can be a poly-glycidyl ether derivative of polyalkoxylated glycerol, polyglycerol, polyalkoxylated polyglycerol, arabitol, xylitol, manitol, sorbitol, dulcitol, or inositol. The curable resin can be a poly-glycidyl-ether. The curable resin can be selected from the group consisting of trimethylolpropane triglycidyl ether, glycerol triglycidyl ether, pentaerythritol tetraglycidyl ether, glycerol polyethylene oxide triglycidyl ether, glycerol polypropylene oxide triglycidyl ether, polyglycerol-3-polyglycidyl ether, polyglycerol-3-olyethylene oxide polyglycidyl ether, polyglycerol-3-polypropylene oxide polyglycidyl ether, and combinations thereof. According to certain embodiments, the curable resin is derived from a natural origin and is environmentally friendly. An example of an environmentally-friendly curable resin is glycerol triglycidyl ether derived from vegetable oil. According to certain other embodiments, the curable resin does not contain an aromatic group. The lack of an aromatic group enables the curable resin to receive a better environmental rating and be more environmentally friendly compared to other resins that contain an aromatic group.

The following are some illustrative chemical structures for suitable curable resins containing three or more epoxy functional groups.

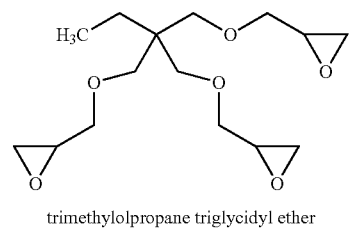

trimethylolpropane triglycidyl ether

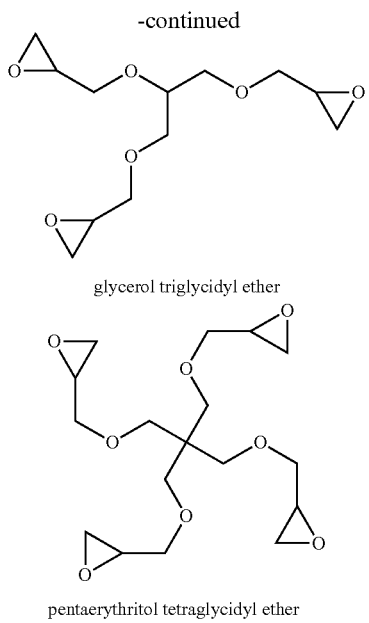

glycerol triglycidyl ether pentaerythritol tetraglycidyl ether

The proppant can be naturally-occurring or synthetic. The proppant can be selected from the group consisting of silicon dioxide, walnut shells, sintered bauxite, glass, plastics, ceramic materials, cured resinous particulates comprising nut shell pieces, seed shell pieces, cured resinous particulates comprising seed shell pieces, fruit pit pieces, cured resinous particulates comprising fruit pit pieces, wood, and any combination thereof in any proportion. The proppant can have a particle size in the range of about 0.0625 millimeters up to 3 millimeters.

According to certain embodiments, the methods include coating the curable resin onto a least a portion of the proppant particles, wherein the curable resin does not substantially cure during the coating process. Accordingly, the curable resin does not come in contact with a curing agent during the coating process. This allows the coated proppant to be placed in the desired location and then cured via a reaction with the curing agent to form a consolidated proppant pack.

The curable resin can have a chemical attraction to the proppant. The curable resin can also interact with the surface of the proppant. Accordingly, the curable resin can have a chemical attraction to the proppant, and then when in contact with the proppant, interact with the proppant particles to coat the surface of at least some of, and preferably all of, the proppant particles.

The method of coating can further include using the coated proppant in an oil or gas operation. The coated proppant can be contacted with a curing agent. The curing agent can cause the curable resin to cure. The cured resin can increase the strength of the proppant due to formation of the multi-directional polymer network between the curable resin and the curing agent. The strength of the proppant can be increased to a crush strength of at least 5,000 psi (34.5 megapascals "MPa") or at least 8,000 psi (55.2 MPa).

According to certain embodiments, methods of fracturing a subterranean formation include introducing a fracturing fluid into the subterranean formation. The fracturing fluid comprises a base fluid. The base fluid can comprise water. The water can be selected from the group consisting of fresh water, brackish water, sea water, brine, and any combination thereof in any proportion. The fracturing fluid can also include water-miscible liquids, hydrocarbon liquids, and gases.

The fracturing fluid also includes the proppant and the curable resin. The curable resin can be pre-coated onto the proppant prior to introduction into the subterranean formation. The curable resin can also be included in the fracturing fluid and coat the proppant prior to, during, and/or after introduction into the subterranean formation, but after mixing with the proppant. By way of example, once placed downhole, the curable resin can be attracted to the proppant and coat all or a portion of the proppant particles located in the subterranean formation.

The curable resin can be thermally stable at the bottomhole temperature of the subterranean formation. As used herein, the term "bottomhole" means the location of the curable resin in the subterranean formation.

The fracturing system 10 of FIG. 1 can include a fracturing fluid producing apparatus 20, a fluid source 30, a proppant source 40, and a pump and blender system 50 and resides at the surface at a well site where a well 60 is located. In certain embodiments, the fracturing fluid producing apparatus 20 combines a gel precursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30.

The proppant source 40 can include a proppant for combining with the fracturing fluid. The system may also include additive source 70 that provides one or more additives (e.g., gelling agents, weighting agents, and/or other optional additives) to alter the properties of the fracturing fluid.

The pump and blender system 50 can receive the fracturing fluid and combine it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. The fracturing fluid producing apparatus 20, fluid source 30, and/or proppant source 40 can each be equipped with one or more metering devices (not shown) to control the flow of fluids, proppant, and/or other compositions to the pumping and blender system 50. Such metering devices may permit the pumping and the blender system 50 to pull from one, some, or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppant at other times, and combinations of those components at yet other times.

Figure 2:
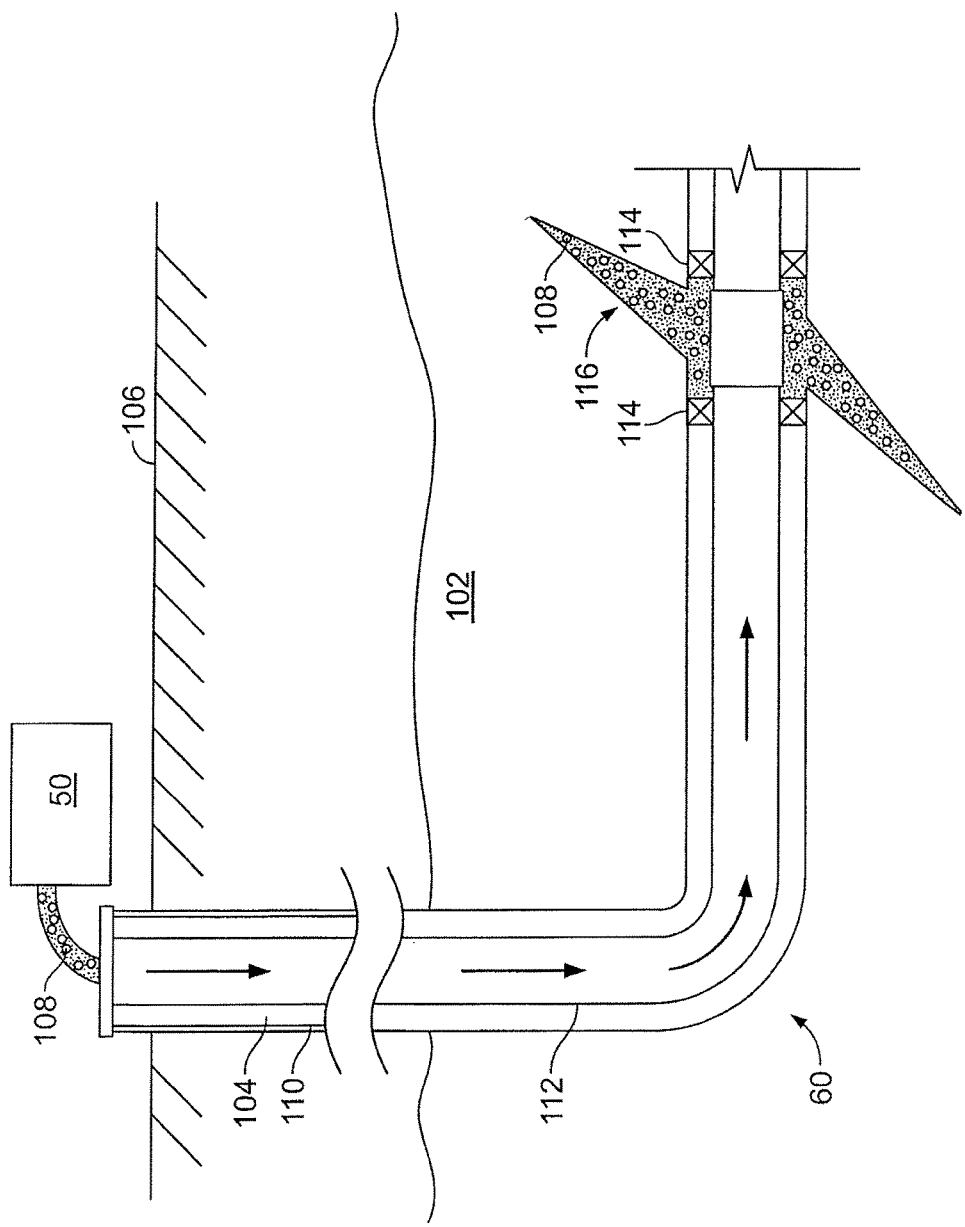
FIG. 2 is a diagram illustrating a well system in which a fracturing operation can be performed.

The step of introducing can comprise pumping the fracturing fluid into the subterranean formation. FIG. 2 shows the well 60 during a fracturing operation in a portion of a subterranean formation 102. The subterranean formation can be penetrated by a well. The well can be, without limitation, an oil, gas, or water production well, an injection well, or a geothermal well. The well can also be an offshore well. The step of introducing can also include introducing the fracturing fluid into the well. The well includes a wellbore 104. The wellbore 104 extends from the surface 106, and the fracturing fluid 108 is introduced into a portion of the subterranean formation 102. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shaped charges, a perforating gun, hydro-jetting and/or other tools.

The well is shown with a work string 112. The pump and blender system 50 can be coupled to the work string 112 to pump the fracturing fluid 108 into the wellbore 104. The work string 112 can include coiled tubing, jointed pipe, and/or other structures that allow fluid to flow into the wellbore 104. The work string 112 can include flow control devices, bypass valves, ports, and or other tools or well devices that control a flow of fluid from the interior of the work string 112 into the subterranean formation 102. For example, the work string 112 can include ports (not shown) located adjacent to the wellbore wall to communicate the fracturing fluid 108 directly into the subterranean formation 102, and/or the work string 112 can include ports that are spaced apart from the wellbore wall to communicate the fracturing fluid 108 into an annulus that is located between the outside of the work string 112 and the wall of the wellbore.

The well system can include one or more sets of packers 114 that create one or more wellbore intervals. The methods also include creating or enhancing one or more fractures within the subterranean formation using the fracturing fluid. When the fracturing fluid 108 is introduced into wellbore 104 (e.g., in FIG. 2, the wellbore interval located between the packers 114) at a sufficient hydraulic pressure, one or more fractures 116 may be created in the subterranean formation 102. The proppant particulates in the fracturing fluid 108 may enter the fractures 116 where they may remain after the fracturing fluid flows out of the well bore. The proppant can be placed into the one or more fractures during the step of introducing. The proppant can form a proppant pack within the one or more fractures.

The fracturing fluid can also include the curing agent for the curable resin. According to certain embodiments, the curing agent does not begin to cause the curable resin to cure until after the proppant has been positioned in the desired location (e.g., within the one or more fractures) of the subterranean formation. In this manner, the coated proppant can form a proppant pack before becoming consolidated via curing. As discussed above, the curing of the curable resin with the curing agent causes a multi-directional polymer network to be formed. Preferably, a multitude of polymer molecules are cross-linked to form the polymer network. Accordingly, the curable resin can form polymer molecules and become cross-linked with each other via the three or more epoxy functional groups and the available functional groups on the curing agent. The curing agent can also be introduced into the subterranean formation after the step of introducing the fracturing fluid. This embodiment can be useful if the curing agent might cause premature curing of the curable resin. As such, the coated proppant can be placed in the desired location in the subterranean formation and form a proppant pack. The curing agent can then be introduced into the subterranean formation to come in contact with the coated proppant particles of the proppant pack and cause curing of the curable resin and consolidation of the proppant pack. The increased strength of the proppant can be enough to withstand the closure pressures from the one or more fractures; whereas, proppant without the curable resin would not be able to withstand the closure pressures and would crush or allow the fractures to close.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

As used herein, the words "comprise," "have," "include," and all grammatical variations thereof are each intended to have an open, non-limiting meaning that does not exclude additional elements or steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of fracturing a subterranean formation comprising:
   introducing a fracturing fluid into the subterranean formation, wherein the fracturing fluid comprises:
   (A) a base fluid;
   (B) proppant; and
   (C) a curable resin having three or more epoxy functional group, wherein the curable resin is selected from the group consisting of trimethylolpropane trialycidyl ether, glycerol trialycidyl ether, pentaerythritol tetraalycidyl ether, glycerol polyethylene oxide trialycidyl ether, glycerol polypropylene oxide trialycidyl ether, polyalycerol-3-polyalycidyl ether, polyalycerol-3-olyethylene oxide polyalycidyl ether, polyalycerol-3-polypropylene oxide polyalycidyl ether, and combinations thereof;
   wherein the curable resin is pre-coated onto the proppant prior to introduction into the subterranean formation;
   creating or enhancing one or more fractures within the subterranean formation using the fracturing fluid;
   then introducing a curing agent into the subterranean formation; and
   allowing or causing to allow the curing agent to contact the curable resin in the subterranean formation; wherein the curable resin does not substantially cure prior to contacting the curing agent; wherein the curable resin cures when in contact with the curing agent; wherein the curable resin forms polymer molecules with the curing agent, and wherein the polymer molecules are non-linear or multi-directional polymers; wherein at least some of the three or more epoxy functional groups cross-link the polymer molecules together; wherein the curable resin and the curing agent form a multi-directional, cross-linked polymer network; and
   wherein the cured resin increases the compressive strength of the proppant, wherein the compressive strength of the proppant is increased to a strength of at least 5,000 pounds force per square inch.

2. The method according to claim 1, wherein the curing agent is selected from the group consisting of amines, amides, acids, anhydrides, phenols, thiols, and combinations thereof.

3. The method according to claim 1, wherein the curable resin does not comprise an aromatic group.

4. The method according to claim 1, wherein the proppant is selected from the group consisting of silicon dioxide, walnut shells, sintered bauxite, glass, plastics, ceramic materials, cured resinous particulates comprising nut shell pieces, seed shell pieces, cured resinous particulates comprising seed shell pieces, fruit pit pieces, cured resinous particulates comprising fruit pit pieces, wood, and any combination thereof in any proportion.

5. The method according to claim 1, further comprising mixing the fracturing fluid using mixing equipment.

6. The method according to claim 1, wherein the step of introducing comprises using one or more pumps.

* * * * *